(No Model.) 2 Sheets—Sheet 1.

E. A. SPERRY.
ELECTRIC GENERATOR AND MOTOR.

No. 476,426. Patented June 7, 1892.

Witnesses:
Saml. B. Dover.
Geo Elmslie

Inventor:
Elmer A. Sperry.

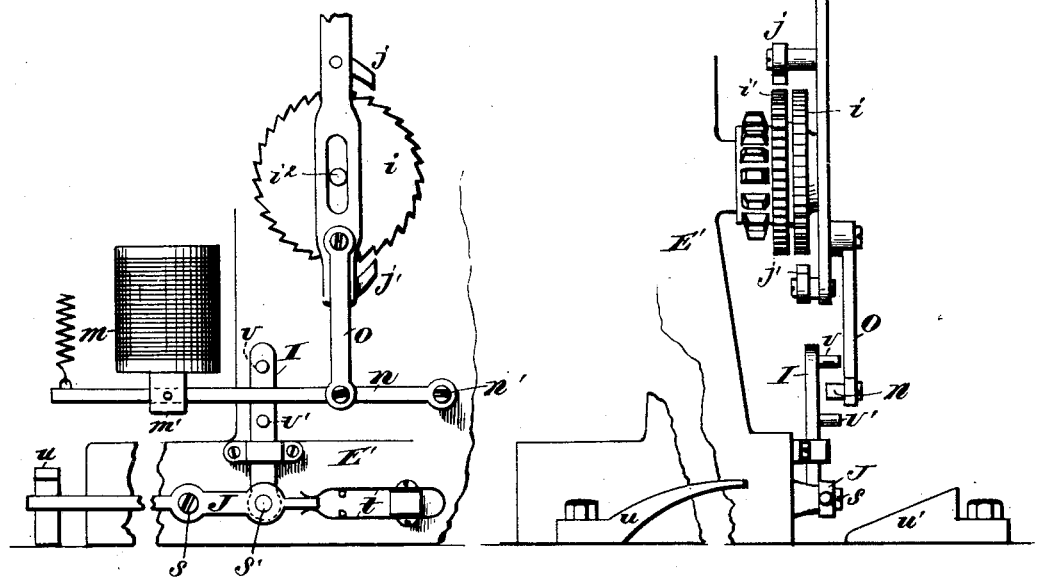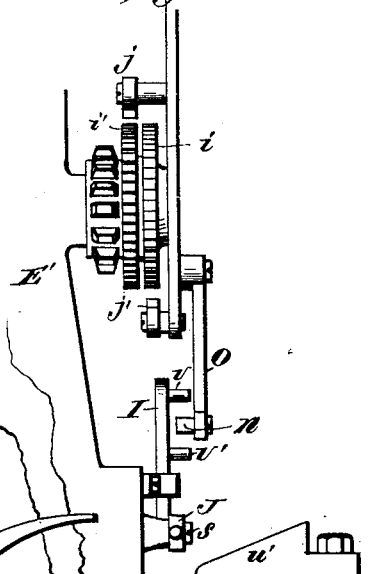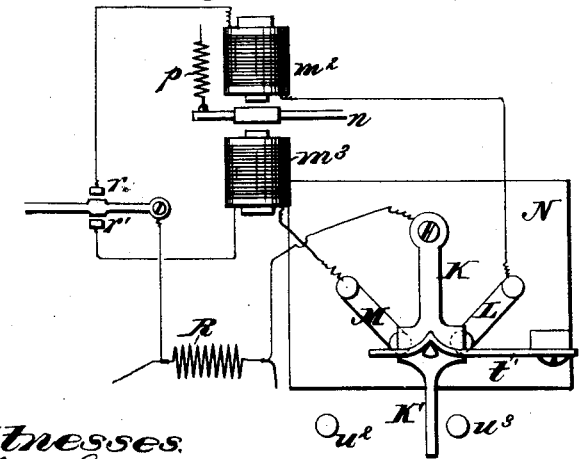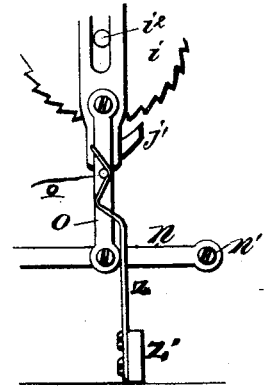

UNITED STATES PATENT OFFICE.

ELMER A. SPERRY, OF CHICAGO, ILLINOIS.

ELECTRIC GENERATOR OR MOTOR.

SPECIFICATION forming part of Letters Patent No. 476,426, dated June 7, 1892.

Application filed April 3, 1886. Serial No. 197,595. (No model.)

*To all whom it may concern:*

Be it known that I, ELMER A. SPERRY, of Chicago, county of Cook, State of Illinois, have invented certain new and useful Improvements in Electric Generators or Motors, of which the following is a clear and exact description, reference being had to the accompanying drawings, forming a part hereof.

My invention relates to the regulation of the generation of currents of electricity in a dynamo-electric machine or the developing of the opposing or counter electro-motive force in an electric motor.

It consists, first, in such an arrangement and disposition of parts as will allow of a relative movement of the armature and field-magnets of the machine, tending to vary the inductive effect of the one upon the other in such a way as to vary the current generated or in the armature rendered effective in case of motors.

It consists, secondly, of certain devices whereby such movement may be produced automatically in response to variations in the electro-motive force or density of a current.

It further consists, thirdly, of such an arrangement as will cause a simultaneous movement of the angular position of the collecting-brushes upon the commutator—that is, as the armature is moved to and from its field the collecting-brushes are rotated through a greater or less number of degrees, varying with the character of the machine, so as to always hold its contact-points coincident with the neutral or other desirable points on the armature or commutator.

Figure 1:
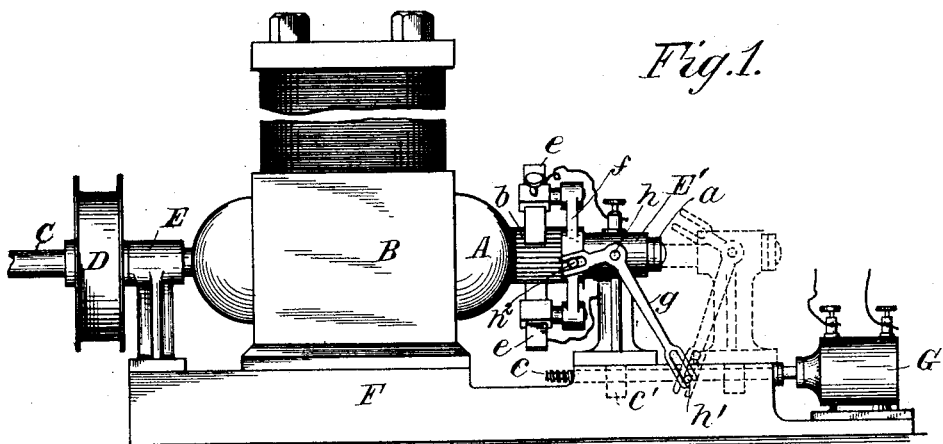
Figure 2:
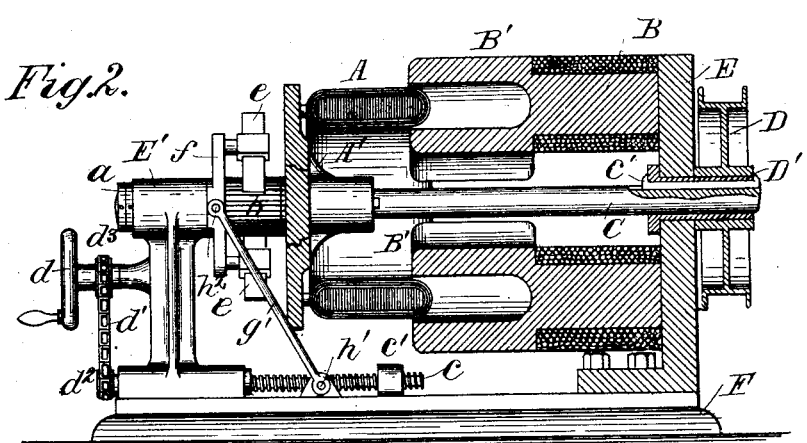
Figure 4:
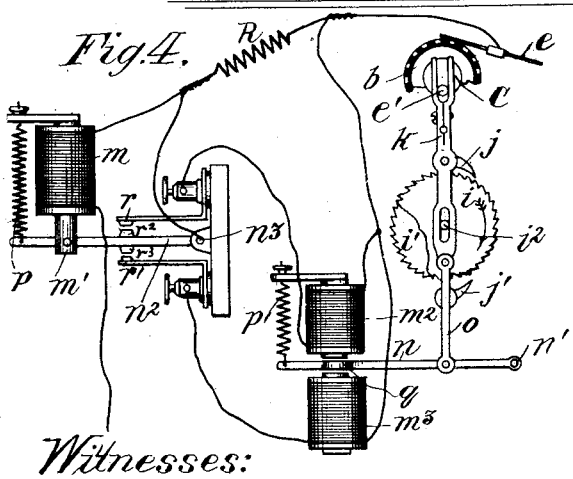
Figure 3:
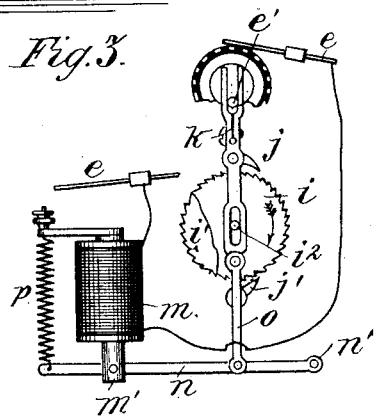

In the drawings, Figure 1 illustrates a generator or motor in which a Siemens or cylindrical armature is employed, being a side elevation of same. Fig. 2 represents a generator or motor in which an annular armature is employed, being also a side elevation, partially in section. Fig. 3 represents a diagrammatic view of a regulator, by means of which an electric current is made to cause the armature to be withdrawn and inserted in the fields. Fig. 4 represents an alternate form of same. Fig. 5 shows a front view of the detail as applied to the construction shown in Fig. 3. Fig. 6 is a side elevation of the same. Fig. 7 shows the detail of an electric switch as applied to the construction shown in Fig. 4. Fig. 8 is a detail of the link $o$ in both Figs. 3 and 4, showing a centralizing-spring.

Similar letters refer to similar parts in the drawings.

Referring to Fig. 1, the armature A revolves in the field-magnet in the usual manner, it being mounted on its shaft C. The letter D represents the pulley. The shaft is made to freely slide through the rear fixed standard E, which has a bearing for said shaft. The front standard E' constitutes another bearing for said shaft, and is placed between collars $a$ upon the one side and the commutator $b$ upon the other side, and is so arranged upon the base F that it may slide freely laterally or in line of the shaft by means of a suitable device located or shown by the governor G, which in this case is made to operate a screw $c$, operating in a burr (shown in dotted lines by $c'$) which forms a part of the standard E'. As the screw operates the burr $c'$ the standard attached thereto is caused to slide, and ultimately assume the position of the dotted lines to the right. This movement draws the shaft with the same, and also the armature A from within the embrace of the pole-pieces. The pulley D can be made attached to the standard E, allowing the shaft C then to slide through both at once, as in the case of Fig. 2; or it can be keyed directly upon the shaft and depend upon its flanges for guiding the belt in the well-known manner.

The form shown in Fig. 2 varies from the foregoing by having its armature A in its farthest position as withdrawn from the field-magnet. The armature in this case is mounted by its free edge so as to revolve exterior as well as interior to the field pole-pieces B', according to the methods set forth in former patents granted me. In this figure the operation of the device is made to depend upon an attendant, who by turning the wheel $d$ causes the screw $c$ to revolve in the burr $c'$ by means of a chain $d'$, mounted upon the front standard, operating upon pinions $d^2$ and $d^3$, as shown, and as in the case above described.

It is well understood that the armature may be withdrawn from the field-magnet by having spider A' slide upon the shaft C, or the same relative movement could be gained by allowing both the shaft C and armature A to remain stationary and move the field-magnet B; but it being the larger it is thought best to move only the armature or the armature and shaft, as is shown in the views. I do not care, however, to limit myself to the particular method shown herein.

In both of the above figures the commutator and collecting-brushes $e$ are mounted upon a yoke $f$, which is again mounted upon the extremity of the standard E' in such a manner as to be free to rotate about the axis of the machine concentrically with periphery of the commutator $b$. Any suitable means may be employed for the rotation of this yoke $f$ through a comparatively small angle simultaneously with the movement of the armature, as shown in the drawings.

In Fig. 1 a bell-crank lever $g$ is fulcrumed at point $h$ and made to engage a stationary pin $h'$ upon the base F and also a pin $h^2$ upon the movable yoke $f$. The bell-crank lever is slotted at either of its extremities to engage the pin $h'$ and $h^2$, respectively.

In Fig. 2 a link (shown by $g'$) connects the pin $h'$ with the pin $h^2$, which is located, as in the above case, upon the movable yoke $f$ in such a manner as to rotate the same about its axis simultaneously with the longitudinal movement of the journal E'.

The device, shown in Figs. 3 and 4 are for the purpose of operating or causing the movement of the chain-burr $d^3$, which in Fig. 2 is shown connected with the hand-wheel $d$, by means of which an attendant can cause its movement. This hand-wheel may still be retained, and connected, also, with the burr $d^3$ are the two ratchet-wheels $i$ and $i'$, which are of opposite phase—that is, the teeth are turned in opposite directions. There are also two dogs $j$ and $j'$, which are located in such a manner as to engage with the ratchets $i$ and $i'$, respectively, when they are sufficiently moved toward the center of their respective ratchets. These dogs $j$ and $j'$ are attached to a vibrating link $k$, which is caused to vibrate about the center $i^2$ of the ratchets, as shown, the link $k$ being slotted suitably to allow of its longitudinal movement up and down, as well as about the said pin $i^2$. The upper extremity of this vibrating link is slotted and embraces the eccentric-pin $e'$, which is placed upon the end of the shaft C and a short distance from the center thereof.

The commutator is indicated at $b$ and the brushes at $e$, and magnet $m$, with its movable core $m'$, is so arranged as to control the vibration of a lever $n$ about the fulcrum $n'$. This lever connects with the vibrating link $k$ by a subsidiary link $o$, connected to said vibrating link, as shown. An adjusting-spring $p$ is shown in connection with the lever $n$. The magnet $m$ is placed suitably in circuit. In Fig. 3 it is shown connected in a shunt of the brushes $e\ e$. Fig. 4 is an alternate form of Fig. 3, differing therefrom only in the electrical part of the device, wherein the lever $n$ bears an armature $q$, which vibrates between two magnets $m^2$ and $m^3$, the current through these magnets being controlled by two contacts $r^2$ and $r^3$, located between the springs $r$ and $r'$, and a lever $n^2$, fulcrumed at $n^3$ and adjusted as to its position by spring $p$. The spring $p'$ adjusts the lever $n$ and holds the same half-way between $m^2$ and $m^3$ when at rest. The circuits through $m^2$ and $m^3$ are in a shunt of the resistance R, and the magnet $m^2$ is connected with the contact-spring $r$ and $m^3$ with contact-spring $r'$, and lever $n^2$ is connected with the other terminal of the resistance R. The magnet $m$ here is shown in the main circuit.

The operation of the devices shown in the above-described views is as follows: The screw $c$ is caused to operate by any suitable means—such as a motor or governor G—through the burr $c'$, which is attached to the standard E', this being so attached to the shaft that in its movements the shaft is caused to move simultaneously. The commutator $b$ and the armature A are all caused to move together, as will readily be understood. The fulcrum $h$, being attached to said standard with each new position of same, the lever $g$ will assume a new angle about said fulcrum $h$, and its short-arm engaging pin $h^2$ will also be found to assume a new angle, carrying along with it said pin $h^2$, the yoke $f$, and commutator-brushes $e\ e$. This motion will change the angular position of the brushes upon the commutator $b$, as shown.

In Fig. 2 the pulley D is mounted upon a sleeve D', with a flange upon the inner side of the standard E. This sleeve D' is connected with shaft C by means of a feather C' by the well-known method, allowing the shaft to slide freely laterally, but causes all parts to rotate simultaneously. The spider A' is connected rigidly upon the shaft, which is secured longitudinally in the front standard E', as in the case of Fig. 1. This journal is moved longitudinally upon the base F; also, as in the case of Fig. 1, by means of a suitable screw $c$, operating in the burr $c'$, the screw in this case being attached to the standard E', and the burr upon the base F by turning the hand-wheel $d$, the chain $d'$ operating over the pinion $d^3$ and connecting the same with pinion $d^2$ upon screw $c$. The commutator-brushes are rotated slightly about the commutator by the link $g'$, as will readily be understood.

The operation of the automatic device shown in Fig. 3 is as follows: The rotation of the shaft C causes a lateral vibration of the link $k$ upon the center $i^2$ by means of the eccentric-pin $e'$. The dogs $j$ and $j'$ are thereby caused to vibrate in close proximity to their respective ratchets of opposite phase $i$ and $i'$, but are held out of engagement therefrom by the spring $p$ and core $m'$, supporting the lever $n$ and link $o$. A slot in the vibrating link $k$ at point $i^2$ allows of this longitudinal movement of the said vibrating link. Upon the increase of the difference of potential between the brushes $e\ e$ in the core either of a generator or motor the current in the magnet $m$ increases the attraction upon the core $m'$, which causes the same to move upward, drawing lever $n$ and forcing the dog $j'$ into engagement with the ratchet $i'$, causing the same to rotate in opposite direction to the arrow shown upon $i$. This causes rotation of the pinion $d^3$, Fig. 2, moving the chain $d'$ and pinion $d^2$, thereby rotating the screw $c$ in such a manner as to cause the standard $E'$ and armature $A$ to move toward the left, thereby withdrawing it from the field pole-pieces, thereby decreasing the inductive action between the field-magnet and armature and decreasing the electro-motive force between the brushes $e\ e$, bringing the current in the magnet $m$ to normal. Should it go below the normal, the core $m$ would be allowed to fall downward, bringing with it the vibrating link $k$ and allowing the dog $j$ to engage its ratchet $i$ and turn the screw $c$ in opposite direction, as will readily be understood.

The portion of the device $e$ in Fig. 4 is identical with the last view, with the exception that the lever $n$ is not under the immediate control of the magnet $m$; but it is controlled by subsidiary magnets, which are thrown alternately into circuit and into action by a delicate movement of the core $m'$ by establishing a contact between $n^2$ and either of the contact-springs $r$ or $r'$. This gives a more positive movement to the vibrating lever $k$ and allows of a more delicate adjustment of the controlling-magnet $m$ and its core $m'$.

In the foregoing I have described no devices for preventing the ultra movement of the parts in either direction, which is very important and which I will now proceed to describe in connection with Figs. 5 to 8, inclusive, of the drawings. It will readily be understood that should the screw $c$, which is operated by the ratchets and pawls, as above described, continue to rotate after the armature is in its farthermost position within the field pole-pieces, the result would be disastrous to the armature if no stop be provided, and, secondly, should such a stop be provided the pawls or ratchets of some of the other mechanical parts would suffer. This may be prevented in various ways, two of which are shown in the figures, and may be described as follows: By referring to Figs. 5 and 6 I indicates a sliding bar mounted upon the moving standard or bearing $E'$ and sliding through a clip secured to said standard or bearing, as shown. The movement of this bar is controlled by the lever J, fulcrumed at point $s$ and pivoted to the slide I at point $s'$ and having a projection which fits between the extremities of a forked spring $t$, which serves to hold the lever and slide in a central position. The free extremity of this lever is organized to engage the trips $u$ and $u'$ when the standard $E'$ moves to a predetermined position, and the lever J by riding upon the inclined surfaces of either of these trips mentioned moves the slide I upward when engaging the first and downward when meeting the second, causing the pins $v\ v'$ to arrest the movement of lever $n$, and thereby disengaging the pawls $j\ j'$ from their respective ratchets, the organization being such as to alternately arrest the further movement of the standard $E'$, leaving the same, however, free to move in the reverse direction, thereby attaining the results heretofore mentioned.

The alternate form of device shown in Fig. 7 is to operate in connection with the devices shown in Fig. 4, and consists of an electric switch K, which is held normally in a central position by the spring $t'$. When in this position the switch rests upon two electric contacts L and M, all of which are mounted upon an insulating base N, which in turn is secured on the standard or bearing $E'$ and moves therewith. A downward projection $k'$ of the switch K serves to engage pins $u^2$ and $u^3$, which are secured to the base of the machine at points opposite which it is desired to arrest the movement of the journal. The contact L is connected with the magnet $m^2$, and contact M is connected with the magnet $m^3$, which are controlled, respectively, at contacts $r\ r'$, and their action upon the armature $g$ engages the ratchets and causes the movement of the journal $E'$ until such time as the projection $K'$ comes in contact with either of the pins $u^2\ u^3$. When this takes place, the circuit in the particular magnet causing the forward movement is broken by a further movement of the journal, this result taking place by reason of the vibration of the switch K breaking contact forming part of the circuit of said magnet.

What I claim as new, and desire to secure by Letters Patent, is—

1. In an electric generator or motor, the combination, with the field-magnets, of the longitudinally-adjustable armature, its rotary shaft and commutator, and the contact-brushes and devices, substantially as shown, for simultaneously adjusting the armature in relation to the field-magnets and changing the angular position of the brushes on the commutator with reference to the field-magnet, for the object herein stated.

2. In an electric generator or motor, the combination, with the armature, field-magnets, commutator, and commutator-brushes in such machines, of mechanism organized to vary or change simultaneously the relation of the first two and second two of the above-named parts, and also the relation between the brushes and the field-magnet, in response to the variations in an electric current, substantially as specified.

3. The combination, with the movable shaft and journal of a generator or motor, the moving brush supports or yoke $f$, and mechanism adapted to rotate or adjust said yoke, operating from the movement of said shaft and journal, of a mechanism adapted to vary the relation between the brushes and field-magnets, substantially as and for the purposes specified.

4. The combination, with the longitudinally-movable shaft and bearing of a generator or motor, of revolving brush supports or yoke $f$, and mechanism adapted to rotate said yoke connected with so as to derive motion from the said shaft and bearing, a mechanism adapted to vary the relation of the brushes to the field-magnets and the relation of the armature and field-magnets simultaneously, substantially as set forth.

5. In a generator or motor, the combination, with the adjustable bearing and longitudinally-movable shaft, of the screw $c$, ratchets $i\ i'$ of opposite phase connected with said screw, and the vibrating pawls or dogs $j\ j'$, adapted to be brought into engagement with said ratchets, substantially as set forth.

6. In an electric generator or motor, the combination of the field-magnets with an armature and a brush-yoke, a mechanism responsive to variations in the main current of the machine, and connections from the same whereby the brush-yoke is rotated about the commutator, and simultaneously therewith the field-magnets and armature are moved with reference to each other, so as to vary the relation of one to the other.

7. In an electric generator or motor, the combination of the field-magnets with an armature and a brush-yoke, a mechanism responsive to variations in the main current of the machine, and connections from the same whereby the brush-yoke is rotated about the commutator and simultaneously therewith the field-magnets and armature are moved with reference to each other so as to vary the relation of one to the other, said mechanism driven from the shaft of the armature.

8. In a generator or motor, the combination of an armature movable along its magnetic field with operating mechanism to cause such movement, and stops organized so as to throw such operating mechanism out of operative connection with the parts when the armature has reached its limit of motion in either direction.

9. In a generator or motor, the combination of an armature movable in its magnetic field with operating mechanism to cause such movement, stops organized so as to throw such operating mechanism out of operative connection with the parts when the armature has reached its limit of motion in either direction, and brushes adapted to be moved about the commutator by said operating mechanism simultaneously with the motion of the armature.

In testimony whereof I have affixed my signature to this specification in the presence of two subscribing witnesses.

ELMER A. SPERRY.

Witnesses:
CHARLES B. VER NOOY,
L. EVERINGHAM.